United States Patent [19]
Roh

[11] Patent Number: 5,846,441
[45] Date of Patent: Dec. 8, 1998

[54] METHOD FOR FORMING A PATTERNED METALLIC LAYER IN A THIN FILM MAGNETIC HEAD

[75] Inventor: Jae-Woo Roh, Seoul, Rep. of Korea

[73] Assignee: Daewoo Electronics Co., Ltd., Seoul, Rep. of Korea

[21] Appl. No.: 685,645

[22] Filed: Jul. 24, 1996

[30] Foreign Application Priority Data

Sep. 30, 1995 [KR] Rep. of Korea .................. 1995-33571

[51] Int. Cl.$^6$ ..................................................... B44C 1/22
[52] U.S. Cl. ................................ 216/22; 216/63; 216/67; 216/75; 204/474; 427/473
[58] Field of Search .................................. 216/22, 63, 67, 216/75; 204/474; 427/473

[56] References Cited

U.S. PATENT DOCUMENTS

| | | | |
|---|---|---|---|
| 4,462,881 | 7/1984 | Yamamoto et al. | 204/192 |
| 5,281,300 | 1/1994 | Amemori | 156/626 |
| 5,544,774 | 8/1996 | Gray | 216/22 |

*Primary Examiner*—Yogendra N. Gupta
*Attorney, Agent, or Firm*—Anderson, Kill & Olick, P.C.

[57] ABSTRACT

A method for forming a patterned metallic layer on a substrate is employed to form a first layer on top surface of the substrate. A patterned mask layer is then deposited on top of the first layer, thereby exposing selected portions of the first layer. Thereafter, a second and a third layers are successively formed on top of the selected portions of the first layer, and the patterned mask layer is removed. Subsequently, the first layer is removed except the portions thereof intervening between the top surface of the substrate and the second layer by using a dry etching method to thereby form the patterned metallic layer including the second layer and the exposed portions of the first layer.

6 Claims, 6 Drawing Sheets

METHOD FOR FORMING A PATTERNED METALLIC LAYER IN A THIN FILM MAGNETIC HEAD

FIELD OF THE INVENTION

The present invention relates to a thin film magnetic head; and, more particularly, to a method for forming a patterned metallic layer therein through the use of a dry etching technique.

DESCRIPTION OF THE PRIOR ART

As is well known, a thin film magnetic head is widely used in reading, recording, or erasing signals on a magnetic tape. There is illustrated in FIG. 1 a schematic cross sectional view of a typical thin film magnetic head 111. The thin film magnetic head 111 includes a first lower magnetic core 101 formed on a substrate 100, a second lower magnetic core 102 formed on top of the first lower magnetic core 101 and on a portion of a top surface of the substrate 100, a first insulation layer 104 deposited on top of a portion of the second lower magnetic core 102, a patterned coil layer 108 made of a metallic conductor and formed on top of the first insulation layer 104, a second insulation layer 107 covering the patterned coil layer 108 and a portion of the first insulation layer 104, and an upper magnetic core 106 formed on top of the second insulation layer 107, which also covers portions of the second lower magnetic core 102 and the first insulation layer 104 not covered by the second insulation layer 107. Further, as the second lower magnetic core 102 is provided with a step on the first lower magnetic core 101, each of the layers subsequently formed on top thereof is also provided with a step, resulting in a step region 109.

In FIGS. 2A to 2D, there are provided schematic cross sectional views setting forth a typical prior art method for forming the patterned coil layer 108 on top of the first insulation layer 104 shown in FIG. 1. For the sake of simplicity, a portion of the patterned coil layer 108 located next to the step region 109 is illustrated in FIGS. 2B to 2D. As shown in FIG. 2A, a first and a second seed layers 205 and 206 are successively deposited on top of the first insulation layer 104. The second seed layer 206 is made of a similar material making up the patterned coil layer 108, and the first seed layer 205 is made of a material which enhances adhesion between the first insulation layer 104 and the second seed layer 206. For example, if the patterned coil layer 108 is made of gold (Au), the first seed layer 205 may be made of either titanium (Ti) or chromium (Cr) and the second seed layer 206, Au. In a next step shown in FIG. 2B, a photoresist layer 207 is deposited on top of the second seed layer 206, and a portion thereof is selectively removed by photolithograpy, thereby exposing a selected portion of the second seed layer 206. The patterned coil layer 108 is formed by filling the removed portion of the photoresist layer 207 with an appropriate metal, e.g., Au, by using an electroplating method. Thereafter, the rest of the second seed layer 206 is completely exposed by stripping off the remaining photoresist layer 207 as shown in FIG. 2C. Subsequently, the first and the second seed layers 205 and 206, except the portion thereof intervening between the first insulation layer 104 and the patterned coil layer 108, are removed by using an appropriate etching solution, as shown in FIG. 2D. Typically, a wet etching technique is employed in removing the seed layers. For a removal thereof by a dry etching technique usually leaves some residues of the seed layers on a lower part of the step region 109, the lower part thereof referring to a part of the step region where it begins to show an upward inclination, since the maximum thickness of the seed layers along the etching direction at the step region 109 is normally greater than that at a flat region 110.

However, during the removal of the first and the second seed layers 205 and 206 by using a wet etching technique, portions of the patterned coil layer 108 and the first and the second seed layers 205 and 206 are also removed due to the isotropic etching nature of the etching solution used, resulting in undesirable edge profiles 209 and 210 developed.

The undesirable edge profiles may degrade the properties of the patterned coil layer 108 and also may cause voids to be formed in the second insulation layer 107, which may, in turn, degrade the performance of the thin film magnetic head 111.

SUMMARY OF THE INVENTION

It is, therefore, a primary object of the present invention to provide a method for forming a patterned coil layer on an insulation layer in a thin film magnetic head, the method being capable of allowing the patterned coil layer to be formed with their edges preserved.

In accordance with the present invention, there is provided a method for forming a patterned metallic layer on a substrate, comprising the steps of: depositing a first layer on top surface of the substrate; providing a patterned mask layer on top of the first layer, thereby exposing selected portions of the first layer; forming a second and a third layers successively on top of the selected portions of the first layer; removing the patterned mask layer; and removing the first layer except the portions thereof intervening between the top surface of the substrate and the second layer, thereby forming the patterned metallic layer including the second layer and the selected portions of the first layer.

BRIEF DESCRIPTION OF THE DRAWINGS

The present invention together with its objects and advantages will become more apparent in a detailed description of preferred embodiments presented below with reference to the accompanying drawings, wherein.

DETAILED DESCRIPTION OF THE PREFERRED EMBODIMENTS

Referring now on FIGS. 3A to 3D, there are provided schematic cross sectional views setting forth a method for forming a patterned coil layer on an insulation layer in manufacturing a thin film magnetic head in accordance with a preferred embodiment of the present invention. All the thickness described below are measured along the vertical direction which coincides with an etching direction which etchants impinge on during a dry etching process.

Figure 1:
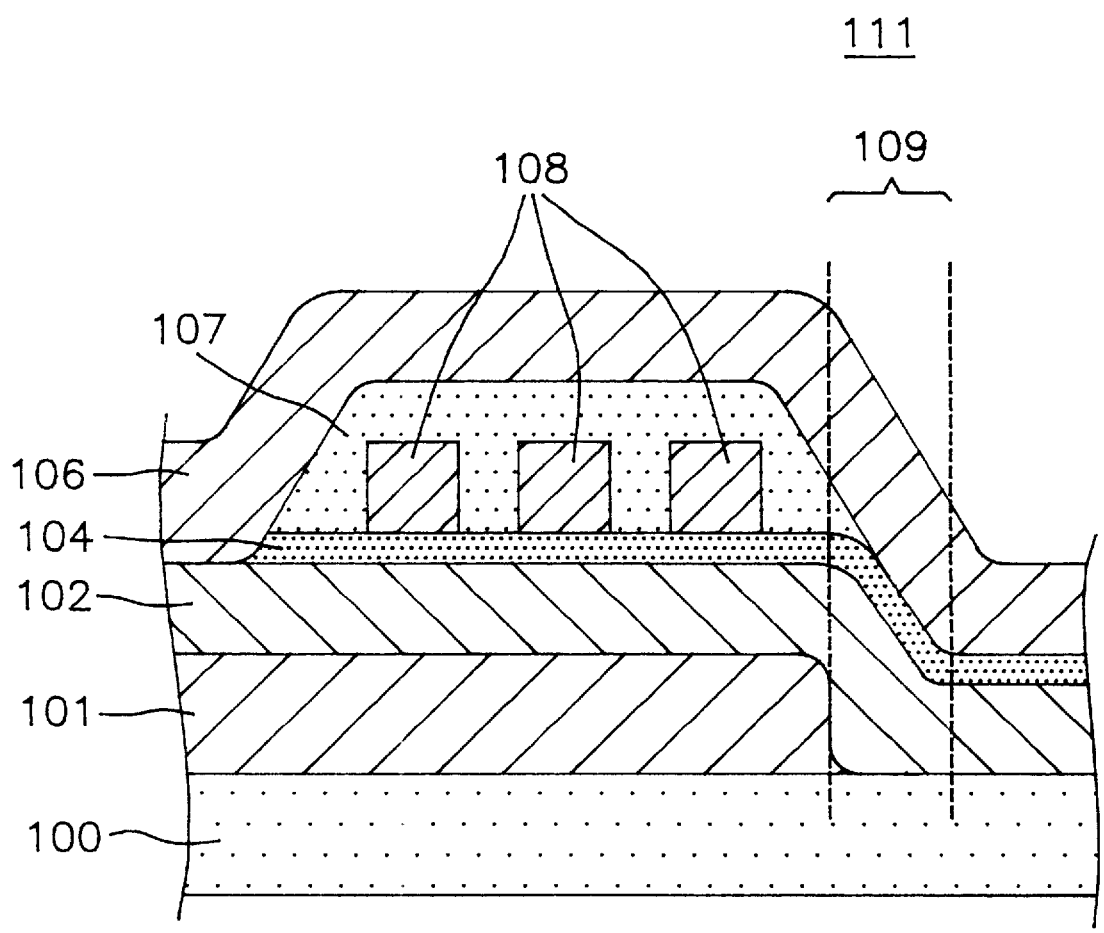
FIG. 1 shows a schematic cross sectional view of a typical thin film magnetic head.
Figure 2A:
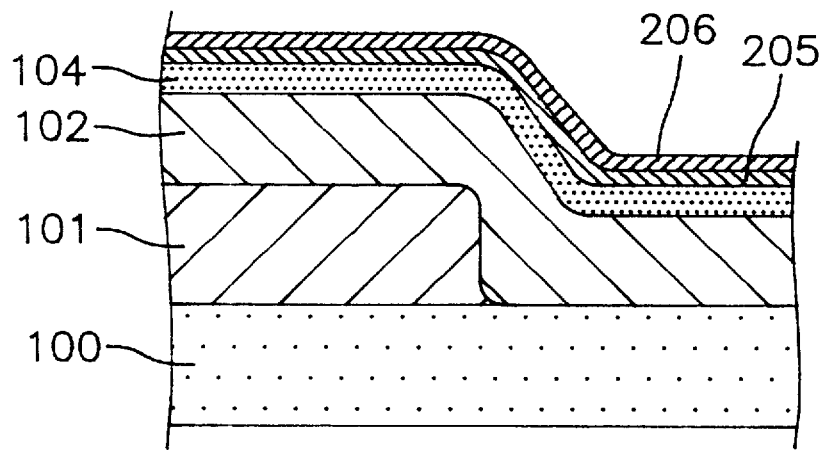
FIGS. 2A to 2D illustrate schematic cross sectional views setting forth a typical prior art method for forming a patterned coil layer in the thin film magnetic head 111 shown in FIG. 1.
Figure 2B:
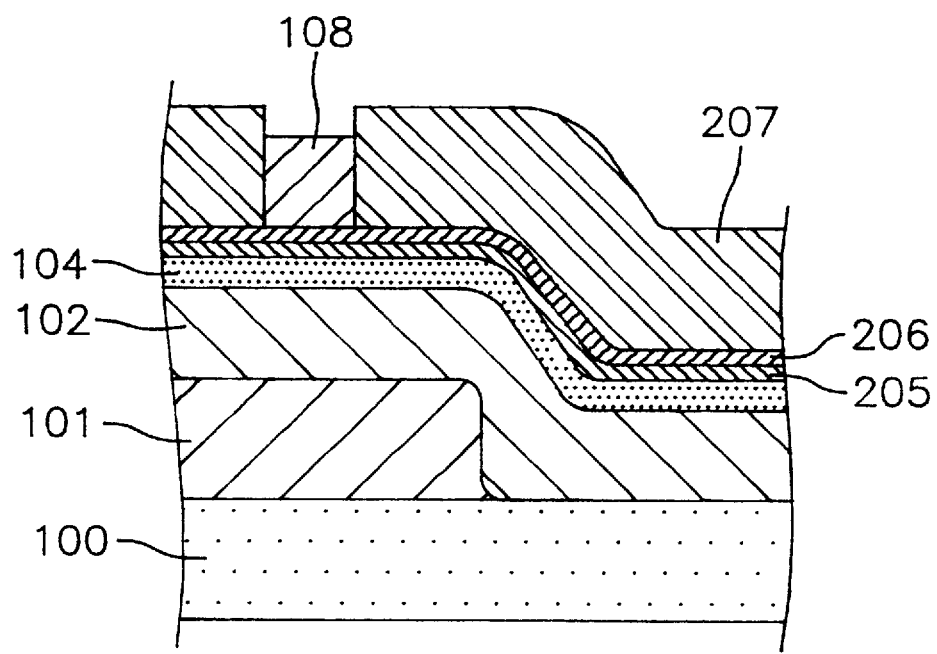
Figure 2C:
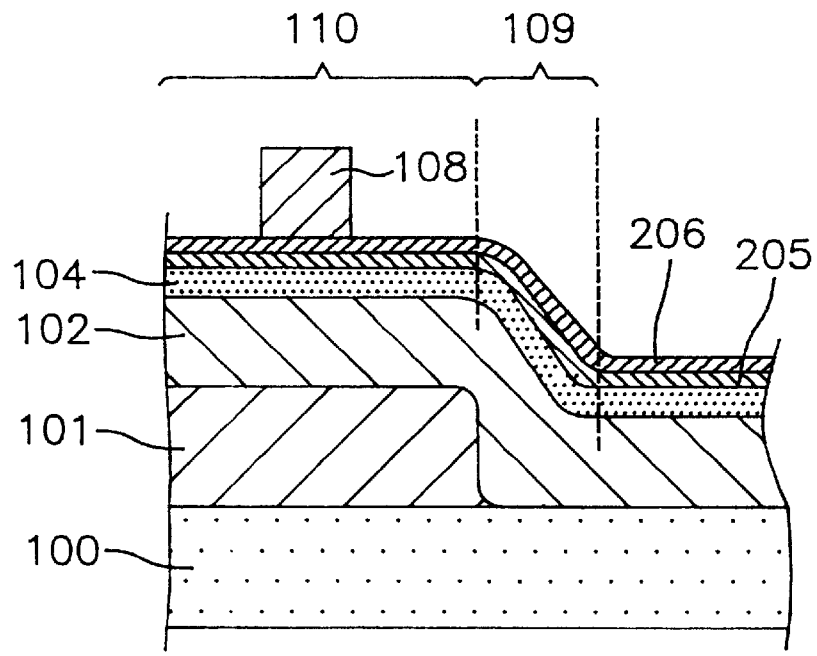
Figure 2D:
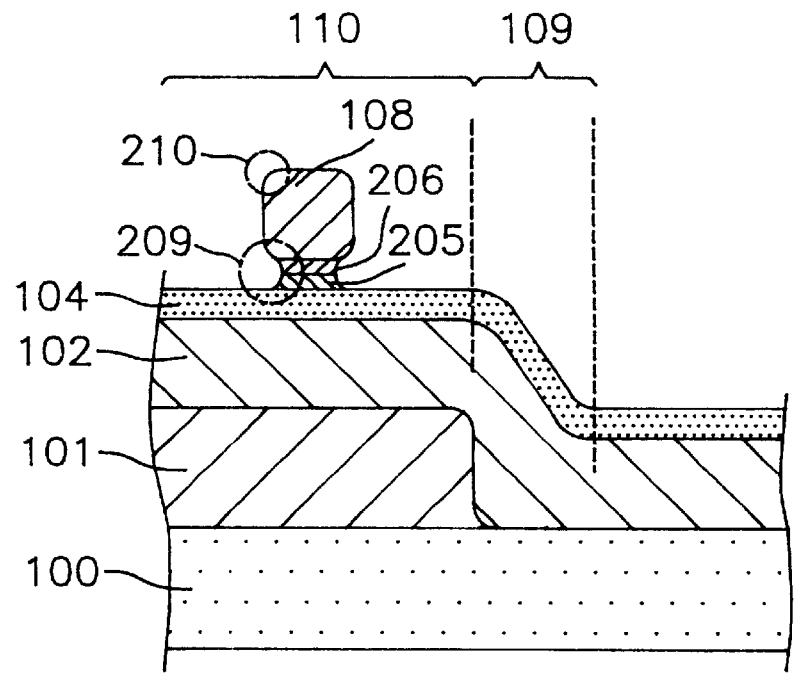
Figure 3A:
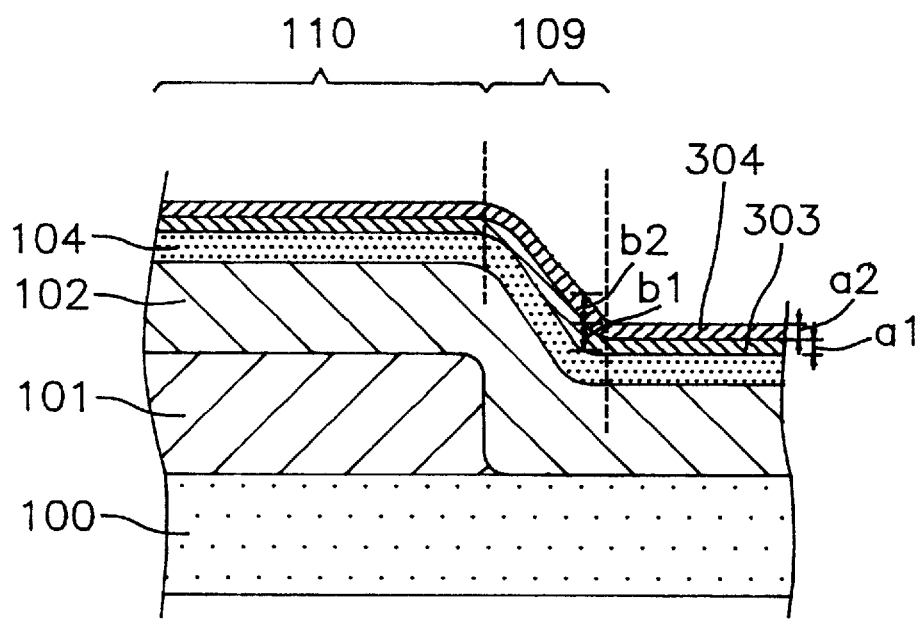
FIGS. 3A to 3D represent schematic cross sectional views illustrating a method for forming the patterned coil layer in accordance with a preferred embodiment of the present invention.

As shown in FIG. 3A, a first and a second seed layers 303 and 304, having thicknesses a1 and a2, respectively, are successively deposited on top of an insulation layer 104. The insulation layer 104 and its underneath layers are prepared in a conventional manner, wherein the underneath layers include a first lower magnetic core 101 formed on a substrate 100 and a second lower magnetic core 102 grown thereon, resulting in a stepped profile having a step region 109 and a flat region 110 as shown in FIG. 3A. Due to the stepped profile which begins to show an upward inclination at a lower part of the step region 109, the maximum thicknesses b1 and b2 of the seed layers 303 and 304 in the step region 109 are greater than the thicknesses a1 and a2 at the flat region 110. Typically the seed layers 303 and 304 are deposited by using a known method such as thermal evaporation method or sputtering method. It should be noted, however, any other deposition technique may be employed therefor as long as it can provide desired properties thereof. The second seed layer 304 is made of a material having similar properties as the material making up a patterned coil layer 306, and the first seed layer 303 is made of a material which enhances adhesion between the first insulation layer 104 and the second seed layer 304. For example, if the patterned coil layer 306 is made of Au, the second seed layer 304 may be made of either Au or palladium (Pd), and the first seed layer 303, either Ti or Cr.

Figure 3B:
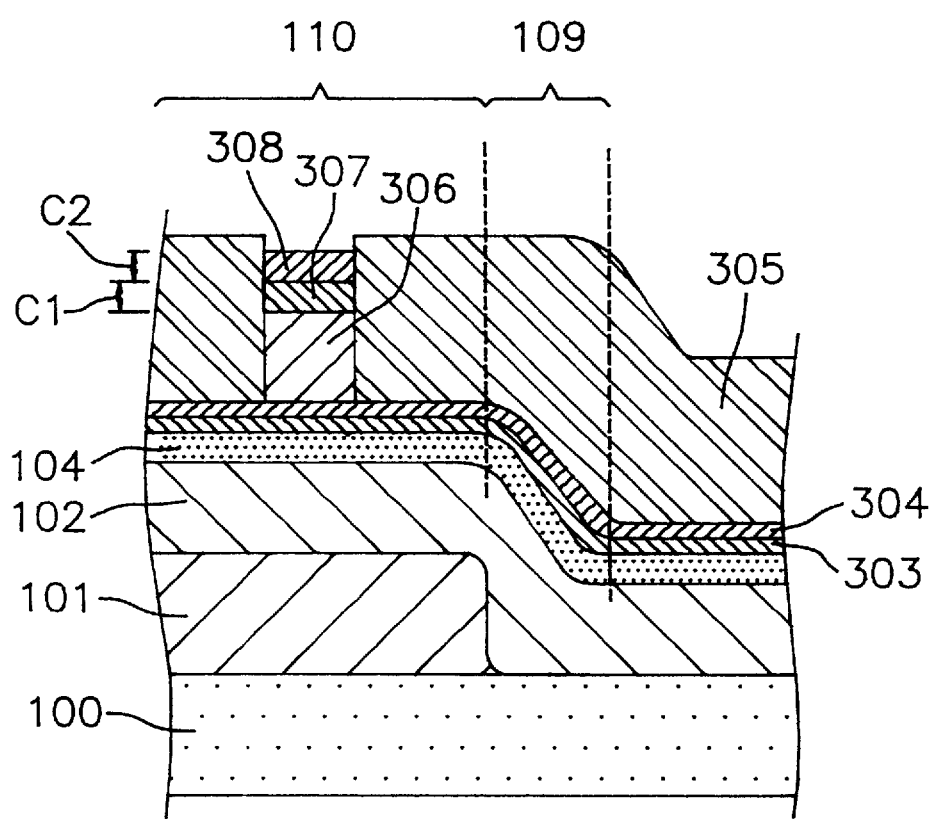

In a next step as shown in FIG. 3B, a masking layer 305, e.g., photoresist layer, is provided on top of the second seed layer 304 and a portion thereof is selectively removed by using a conventional photolithographic technique to expose a selected portion of the second seed layer 304. The patterned coil layer 306 is then formed by filling the removed portion of the mask layer 305 with a metal, e.g., Au, by using a method such as an electroplating technique. In a subsequent step, a first and a second protection layers 307 and 308, made of similar or the same materials as those constituting the first and the second seed layers 303 and 304 and having thicknesses c1 and c2, respectively, are deposited successively on top of the patterned coil layer 306, e.g., by using a same method employed in the formation of the first and the second seed layers 303 and 304.

Figure 3C:
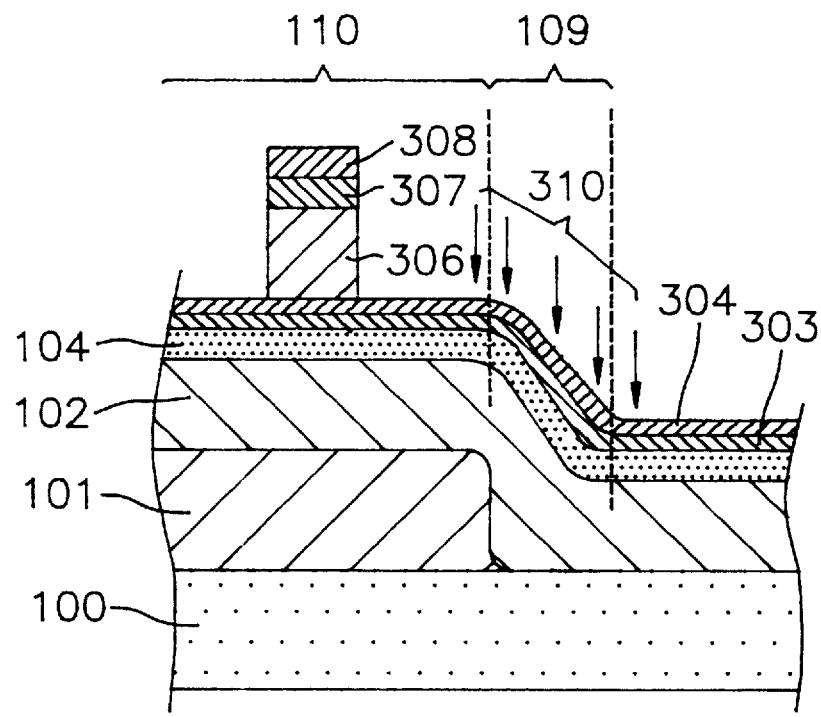
Figure 3D:
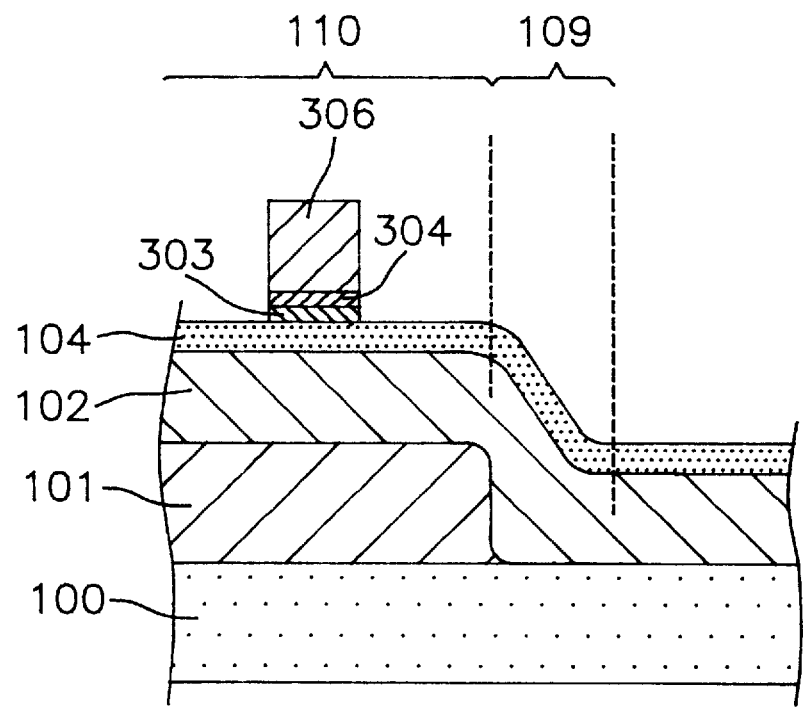

Subsequently, portions of the second seed layer 304, not covered with the patterned coil layer 306, are exposed by stripping off the remaining photoresist layer 305 as shown in FIG. 3C. Thereafter, the first and the second protection layers 307 and 308, and the first and the second seed layers 303 and 304, except the portions thereof intervening between the first insulation layer 104 and the patterned coil layer 306, are removed simultaneously by employing a dry etching method, e.g., chlorine plasma reactive ion etching (RIE), resulting in a structure shown in FIG. 3D.

In order to obtain a complete removal of the selected portions of the first and the second seed layers 303 and 304 that are not covered with the patterned coil layer 306, the first and the second protection layers 307 and 308, provided on top of the patterned coil layer 306, need be 1 to 5 times thicker than the first and the second seed layers 303 and 304 in the flat region 110, respectively.

The reason for the first and the second protection layers 307 and 308 having the thicknesses greater than those of a1 and a2, respectively, is described hereinafter. When the first and second seed layers 303 and 304 are formed on top of the insulation layer 104 having the step region 109 as shown in FIG. 3 A, the maximum thicknesses b1 and b2 of the first and the second seed layers 303 and 304 in the step region 109 depend on the steepness of the step region 109 and the deposition scheme employed to form the first and the second seed layers 303 and 304, respectively and are greater than the corresponding thicknesses a1 and a2 of the first and the second seed layers 303 and 304 in the flat region 110, respectively. If the thicknesses c1 and c2 of the first and the second protection layers 307 and 308 are equal to the thicknesses a1 and a2 of the first and the second seed layers 303 and 304 in the flat region 110, respectively, the complete removal of the first and the second protection layers 307 and 308 using the dry etching method ensures complete removal of the first and second seed layers 303 and 304 in the flat region 110, but does not ensure the complete removal of the seed layers in the step region 109 since the maximum thicknesses b1 and b2 of the first and the second seed layers 303 and 304 in the step region 109 are normally greater than the thicknesses a1 and a2 of the first and the second seed layers 303 and 304 in the flat region 110, respectively, and the dry etching is carried out in the vertical direction only as indicated by the arrows 310 in FIG. 3C.

Theoretically, during the RIE process, if the thicknesses c1 and c2 of the first and the second protection layers 307 and 308 are equal to the maximum thicknesses b1 and b2 of the first and the second seed layers 303 and 304 in the lower part of the step region 109, respectively, the complete removal of the first and the second seed layers 303 and 304 can be achieved when the first and the second protection layers 307 and 308 are completely removed, and vice versa. However, in reality, there may still be non-etched portions of the first and the second seed layers 303 and 304 in the lower part of the step region 109 after the RIE process. Therefore, an extra 10% to 20% surplus thickness of the thicknesses c1 and c2 of the first and the second protection layers 307 and 308 may be provided to the thicknesses c1 and c2 of the first and the second protection layers 307 and 308, respectively, to ensure the complete removal thereof.

Therefore, each of the first and second protection layers 307 and 308 is formed such that c1 and c2 are 1.1 to 1.2 times larger than b1 and b2, respectively, resulting in the first and the second protection layers 307 and 308 having 1 to 5 times thicker thicknesses than those of the first and second seed layers 303 and 304 in the flat region 110, respectively, wherein the proper ratio therebetween depends on the steepness of the step region 109 and the deposition scheme employed to form the first and the second seed layers 303 and 304.

It should be noted that the insulation layer 104 is not be significantly affected during the dry etching of the first and the second seed layers 303 and 304 since the dry etching rate of the insulation layer 104 made of an insulation material is far slower than that of the first and the second seed layers 303 and 304 made of a metal. It should also be appreciated that growing a thicker patterned coil layer than the desired thickness thereof without employing protection layers thereon in order to completely remove seed layers at the lower part of the step region 109 is not desirable since the dry etching rate of the patterned coil layer is far greater than those for the seed layers, entailing a much thicker patterned coil layer to compensate the etching rate difference.

Even though the present invention has been described with reference to the thin film magnetic head and preferred embodiments only, it should be apparent to those skilled in the art that the patterned coil layer formation scheme described above can be applied in any other thin film manufacturing process; and further that other modifications and variations may also be made without departing from the spirit and scope of the present invention as set forth in the following claims.

What is claimed is:

1. A method, for use in fabricating a thin film magnetic head, for forming a patterned coil layer on a top surface of a substrate, the top surface of the substrate being made of an insulating material and having a stepped surface profile, the method comprising the steps of:

(a) depositing a first seed layer and a second seed layer successively on the top surface of the substrate;

(b) providing a patterned mask layer on top of the second seed layer, thereby exposing selected portions of the second seed layer;

(c) electroplating a metallic layer on top of the selected portions of the second seed layer;

(d) depositing a first protection layer and a second protection layer in succession on top of the metallic layer;

(e) removing the patterned mask layer; and (f) dry etching the substrate provided from step (e) until the first and the second seed layers are completely removed except the portions thereof under the metallic layer to form the patterned coil layer.

2. The method according to claim 1, wherein the first and the second protection layers are made of the same metallic materials as those of the first and the second seed layers, respectively.

3. The method according to claim 2, wherein thicknesses of the first and the second protection layers are greater than or equal to maximum thicknesses of the first and the second seed layers measured along the dry etching direction, respectively.

4. The method according to claim 3, wherein said dry etching is carried out by using a dry etching technique capable of providing an etching rate for the insulating material which is slower than those for the first and second seed layers.

5. The method according to claim 4, wherein the dry etching is carried out by a chlorine plasma reactive ion etching.

6. The method according to claim 5, wherein the metallic layer is made of Au, the first seed layer is made of either Ti or Cr, and the second seed layer is made of either Au or Pd.

* * * * *

UNITED STATES PATENT AND TRADEMARK OFFICE

CERTIFICATE OF CORRECTION

PATENT NO.       : 5,846,441
DATED            : December 8, 1998
INVENTOR(S)      : Jae-Woo Roh It is certified that error appears in the above-identified patent and that said Letters Patent is hereby corrected as shown below:

Title page, item [30], should read--
    Foreign Application Priority Data

Sep. 30, 1995  [KR]   Rep. of Korea          95-33571

Signed and Sealed this

Sixth Day of April, 1999

Attest:

Q. TODD DICKINSON

*Attesting Officer*     *Acting Commissioner of Patents and Trademarks*